Patented June 30, 1936

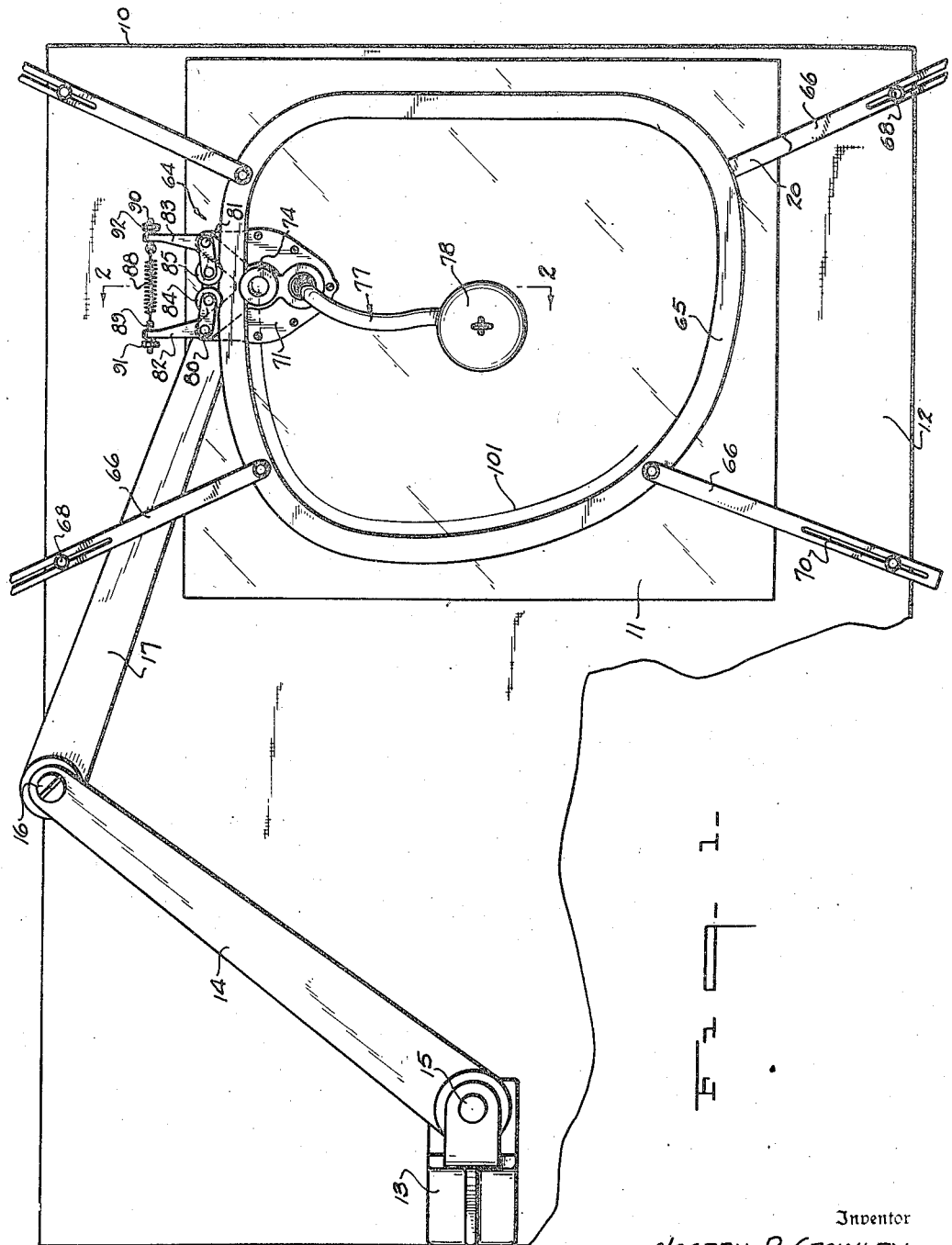

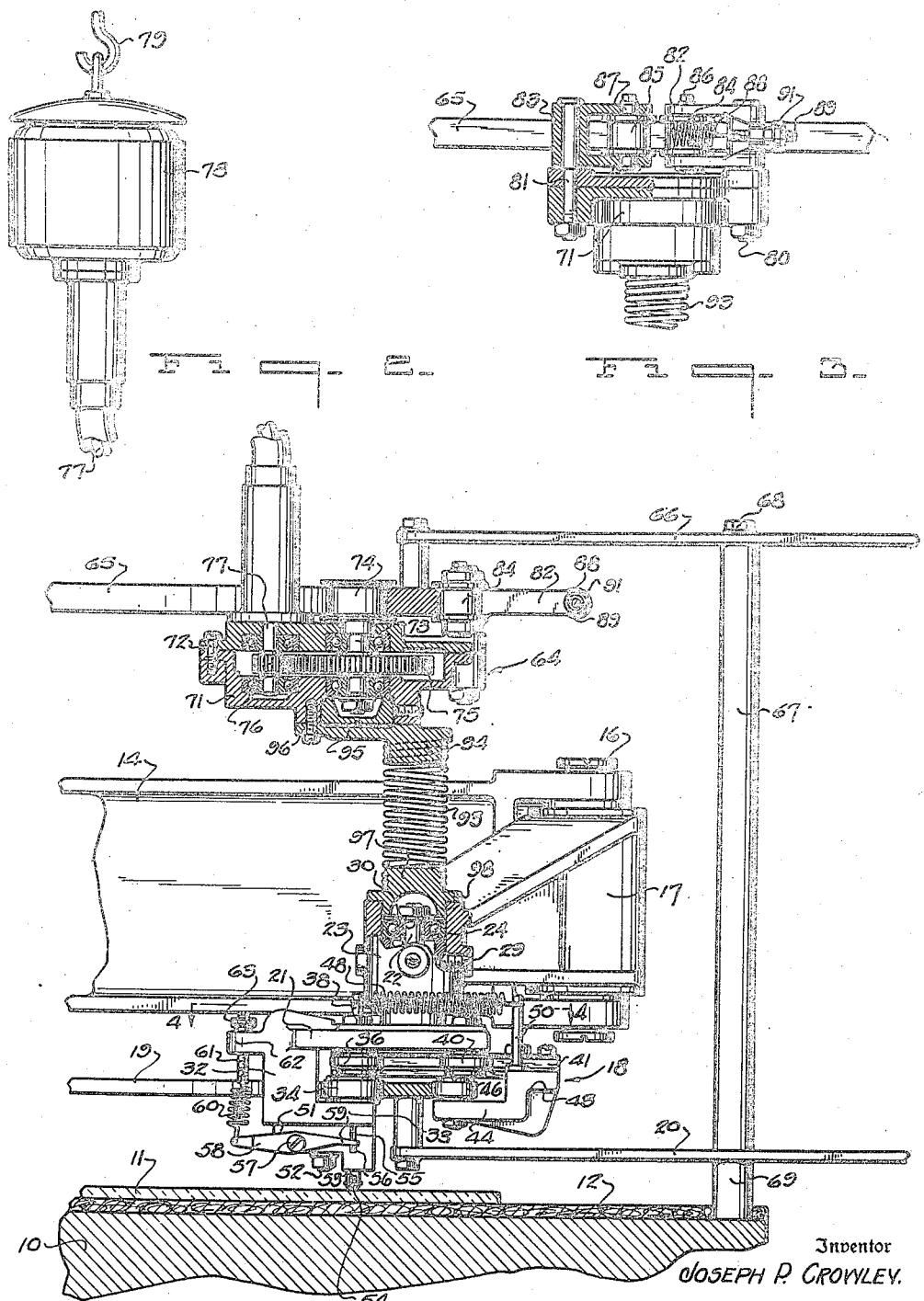

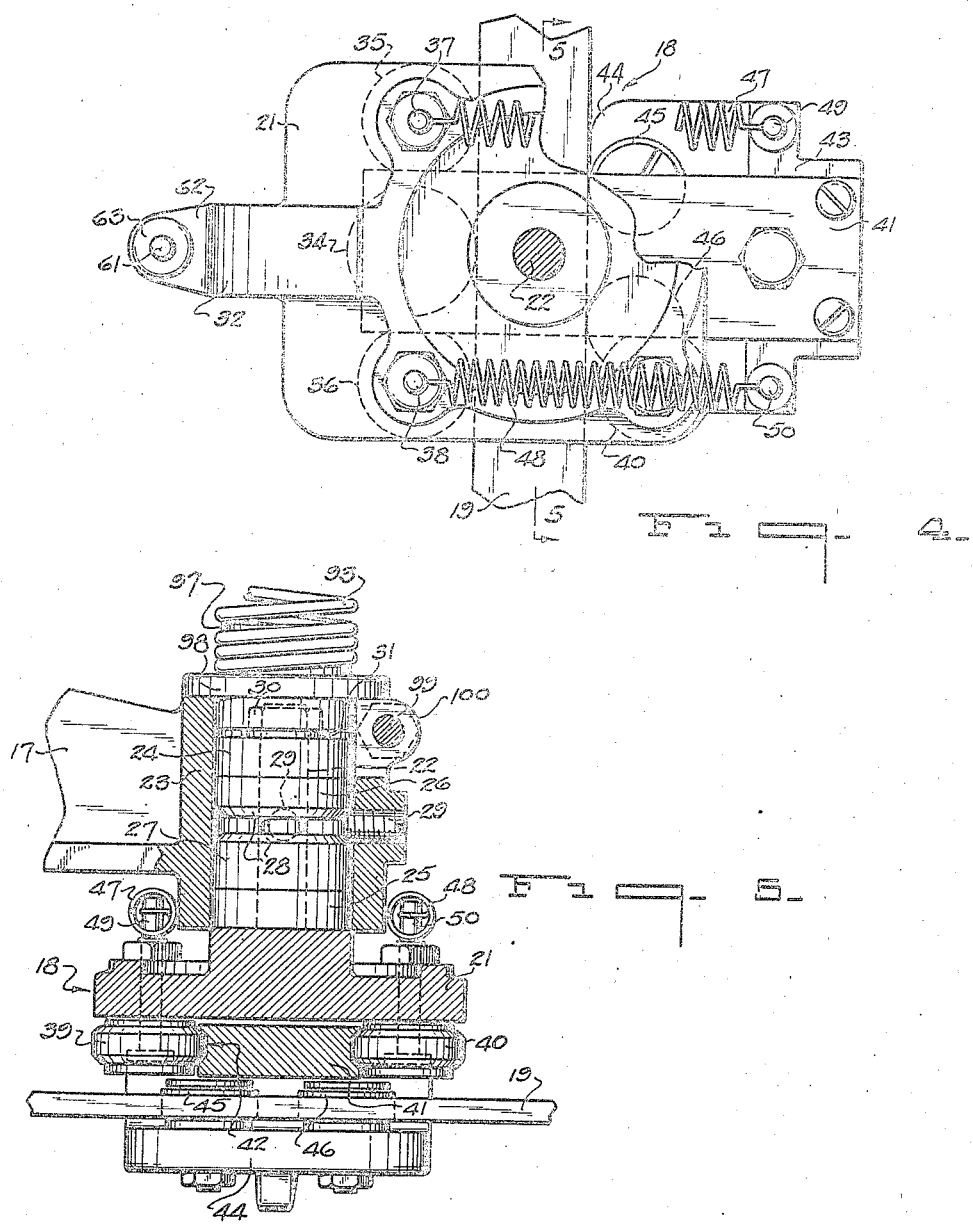

2,045,586

UNITED STATES PATENT OFFICE 2,045,586

CUTTING MACHINE

Joseph P. Crowley, Toledo, Ohio, assignor to Libbey-Owens-Ford Glass Company, Toledo, Ohio, a corporation of Ohio Application October 24, 1934, Serial No. 749,752

16 Claims. (Cl. 33—27)

The present invention relates to improvements in cutting machines generally and more particularly to a machine designed primarily for the cutting of glass sheets or plates, although it is of course not restricted to such use.

At the present time, it is the usual practice, in the cutting out of forms or sections of circular, elliptical, or irregular outline from sheets or plates of glass to employ a template member or pattern plate of the desired shape and size which is first laid upon the glass sheet to be cut, after which the cutting or scoring tool is drawn over and in contact with the glass, being held in engagement with the outer edge of the template or pattern and guided thereby. After the glass has been scored, the template or pattern is removed and the glass broken along the score lines. The cutting or scoring tool commonly employed is of the hand operated variety equipped with either a diamond or a rotatable steel cutting wheel.

The hand method of cutting above described is, however, open to several objections, among which may be mentioned the fact that the template must usually be held upon the glass to be cut with one hand, while the operator draws the scoring tool over the glass with the other hand. When so manipulated, the template sometimes slips or becomes misplaced and the work is spoiled. Also, a uniform cutting pressure on the scoring tool is difficult to maintain throughout its path of travel when moved by hand, with the result that the score is deeper at some places than at others, so that in separating the waste from the cut section, a rough break occurs, leaving the edges of the cut-out section more or less ragged.

It is the aim of this invention to provide a cutting machine which will effectively overcome all of those objectionable features referred to hereinabove as being present in the hand method of cutting and which can also be successfully operated by relatively unskilled workmen.

Another important object of the invention is to provide a cutting machine for cutting out from glass sheets or plates forms or sections of circular, elliptical, or irregular outline rapidly, accurately, and economically.

Another object of the invention is the provision of a cutting machine of the above character wherein the cutting tool is power actuated during the cutting operation, thereby greatly increasing the speed of production of the machine as well as reducing to a minimum the effort and attention required on the part of the operator.

A further object of the invention is the provision of a cutting machine of the above character embodying a template or guide member of a predetermined shape and size and a cutting unit movably mounted thereon, together with means for driving said cutting unit along the template or guide member during the cutting operation to form the desired cut on the glass.

Other objects and advantages of the invention will become more apparent during the course of the following description when taken in connection with the accompanying drawings.

In the drawings wherein like numerals are employed to designate like parts throughout the same, Fig. 1 is a plan view of a cutting machine constructed in accordance with the present invention, Fig. 2 is a sectional view taken substantially on line 2—2 of Fig. 1, Fig. 3 is a detail view of the cutter actuating means partially broken away, Fig. 4 is a section taken substantially on line 4—4 of Fig. 2, and Fig. 5 is a section taken substantially on line 5—5 of Fig. 4.

In the embodiment of the invention illustrated, there is provided a horizontal work table 10 upon which the glass sheet or plate 11 to be cut is adapted to be laid, the upper surface of said table being preferably covered with a pad 12 of felt or some other suitable material to protect the under surface of the glass sheet 11 and to hold it against slippage.

Mounted either directly upon the work table structure or closely adjacent thereto is a fixed supporting bracket 13 to which is pivotally connected a horizontal arm 14, said arm being carried by a vertical pin 15 to swing in a horizontal plane. Hinged to the outer end of the arm 14 upon a vertical pivot pin 16 is a second arm 17 also movable in a horizontal plane and carrying at its outer end the cutting unit designated in its entirety by the numeral 18, said cutting unit being movably mounted upon the template or guide member 19.

The template 19 for guiding the cutting unit 18 preferably comprises a track template structure which is supported horizontally above the table 10 by a plurality of horizontal supporting arms 20. This track template has the same configuration which is intended to be imparted to the section or light of glass to be cut out of the sheet or plate 11 and is arranged thereabove.

The cutting unit 18 travels upon the track 19 and is so constructed and arranged as to form, in effect, a two-part carriage fitting over the said track and being provided with a plurality of rollers engaging the opposite side faces thereof. More specifically, the cutter carriage comprises a substantially rectangular horizontal top plate 21 carrying substantially centrally thereof a vertical stem or bolt 22 which passes upwardly through the bearing 23 formed at the outer end of arm 17. Encircling the bolt 22 within bearing 23, adjacent the upper and lower ends thereof, are the ball bearing assemblies 24 and 25 respectively, which facilitate the turning of the cutting unit as it travels along the track template.

Arranged inwardly of and engaging the ball bearing assemblies 24 and 25 are collars 26 and 27 respectively loosely received upon the bolt 22 and provided at their inner adjacent ends with beveled edges 28. The collars 26 and 27 are spaced from one another, and passing through the bearing 23 are a plurality of set screws 29, the inner ends thereof being received between the said collars and engaging the beveled edges 28. The upper end of the bolt 22 terminates within the bearing 23 and has threaded thereupon a nut 30, while interposed between the nut and the ball bearing assembly 24 is a washer 31. The nut 30 and washer 31 prevent the bolt 22 from slipping downwardly through the ball bearing assembly 24 and collar 26, while the set screws 29 maintain the said ball bearing assembly and collar in position within the bearing 23.

The horizontal top plate 21 of the cutting unit is formed at one end thereof with a downwardly extending roller support 32 which lies adjacent one side of the template 19, said roller support including a substantially horizontal portion 33 carrying a freely rotatable roller 34 adapted to engage the adjacent side face of the template.

Carried upon the underside of the top plate 21, adjacent one end thereof, are the opposed rollers 35 and 36 mounted upon vertical spindles 37 and 38 respectively, while carried upon the underside of said top plate, adjacent the opposite end thereof, are similar rollers 39 and 40 which are in line with the rollers 35 and 36 respectively. Slidably received between the rollers 35—39 and 36—40 is a horizontal slide bar 41, positioned above the track template 19 and extending at right angles relative thereto, said slide bar being provided with grooves 42 in its opposite side faces to receive the rollers therein as best illustrated in Fig. 5.

Secured upon the underside of the slide bar 41 at the outer end thereof is a downwardly extending roller support 43 arranged adjacent the opposite side of the template and having a substantially horizontal portion 44 carrying a pair of spaced apart freely rotatable rollers 45 and 46 which engage the adjacent side face of the track 19. The roller 34 carried by roller support 32 engages the opposite side face of the track at a point intermediate the rollers 45 and 46. The rollers 45 and 46 carried by slide plate 41 are urged into engagement with the side face of the template track 19 by springs 47 and 48, said springs being fastened respectively at one end to the roller spindles 37 and 38 and at their opposite ends to vertical posts 49 and 50 mounted upon the roller support 43.

Carried by the roller support 32 is a cutter holder support 51 secured thereto by a bolt or the like 52, said cutter holder support comprising a metallic block having a substantially rectangular socket formed therein and within which the cutter holder 53 is mounted for vertical sliding movement, said cutter holder carrying at its lower end a freely rotatable steel cutting wheel 54. The opposed side walls of the socket formed in the cutter holder support 51 are provided with vertical slots 55 and carried by the cutter holder and operable within these slots are horizontal pins 56, the downward movement of the cutter holder 53 being limited by the engagement of the pins 56 with the lower ends of said slots.

Pivotally mounted upon the cutter holder support 51 as at 57 is a lever 58, said lever straddling the cutter holder support and the inner ends 59 thereof engaging pins 56 to normally urge the cutter holder 53 and cutting wheel 54 downwardly. Fastened to the opposite end of the lever 58 is a tension spring 60 connected to a screw 61 passing loosely through an ear 62 formed on the roller support 32 and having a nut 63 threaded upon its upper end, said spring 60 acting to yieldably urge the cutting wheel toward and maintain it in engagement with the glass.

As set forth above, this invention contemplates the provision of a cutting machine of the above character wherein the cutting tool is power actuated during the cutting operation and to this end means is provided for driving the cutter carriage along the track 19. The driving mechanism provided for this purpose is mounted above the cutting unit 18 and is designated generally by the numeral 64. This mechanism is carried by a horizontally arranged template or guide member 65 similar to and having substantially the same configuration as the template 19; being mounted directly thereabove. The template 65 is carried by a plurality of horizontal supporting arms 66 engaging the upper ends of vertical sleeves 67 and secured thereto by bolts 68 which pass downwardly through the said sleeves and are secured to the work table 10. While supporting arms 20 carrying template 19 may be fastened in any desired manner, they are here shown as being supported upon the upper ends of relatively short sleeves 69 carried by the work table and being disposed in alignment with sleeves 67 so that the bolts 68 serve to clamp the arms 20 between sleeves 67 and 69. Each of the arms 20 and 66 is also preferably formed with a slot 70 (Fig. 1) through which the bolt 68 is received and which serves to facilitate the accurate positioning of the templates 19 and 65 with respect to one another as well as facilitating the supporting of templates of different shapes and sizes.

The driving mechanism 64 includes a two-part housing 71, the two parts of which are secured together by screws or the like 72. Suitably journaled in the housing is a vertical shaft 73 which projects upwardly therebeyond and has keyed thereto a double flanged roller 74 engaging the inner side face of the template track 65. Fixed to the shaft 73 within housing 71 is a spur gear 75 meshing with a pinion 76 keyed to one end of a flexible shaft 77 also suitably journaled within said housing. The flexible shaft 77 is connected at its opposite end with and driven from a motor 78 suspended in any desired manner above the machine such as from a hook or the like 79. Upon operation of the motor 78, the roller 74 will be driven through the intermeshing gear 75 and pinion 76 to move the housing 71 and associated parts around the template 65.

In order to maintain the roller 74 in engagement with template 65, there are provided the two vertical spindles 80 and 81 carried by the housing 71 at the side of the template opposite that of the roller 74 and having mounted thereupon the substantially L-shaped levers 82 and 83 respectively. Carried at the inner ends of the levers 82 and 83 are the freely rotatable rollers 84 and 85 respectively mounted upon shafts 86 and 87. The rollers 84 and 85 are urged toward and held in engagement with the adjacent side face of the template track 65 by a tension spring 88 fastened at its opposite ends to screws 89 and 90 which pass loosely through the outer ends of the L-shaped levers 82 and 83 and have threaded thereupon nuts 91 and 92. The action of the spring 88 tends to draw the outer ends of the L-shaped levers together which in turn forces the rollers 84 and 85 inwardly into engagement with the template. The tension of the spring 88 may be varied upon proper adjustment of the nuts 91 and 92.

The driving mechanism 64 is operatively connected with and drives the cutting unit 18 around template 19 through a flexible connection here shown as consisting of a relatively large compression spring 93, said spring encircling at its upper end an annular boss 94 formed on a plate 95 secured to the underside of the housing 71 by screws or the like 96, while received in the opposite end of the said spring is the upper end of a cylindrical member 97 carried by bearing 23, said cylindrical member being formed intermediate its ends with an annular flange 98 resting upon the top of said bearing. The bearing 23 is split at its upper end and the lower portion of the member 97 is clamped therein by a bolt 99 passing through ears 100 formed on the said bearing.

In operation, the glass sheet 11 to be cut is first placed in proper position upon the table 10. A template 19 of the desired size and configuration is then mounted above the glass sheet and a similar template 65 mounted directly above template 19. The cutting unit 64 is then arranged on the template 19 with the roller 34 bearing against the inner side face thereof and the rollers 45 and 46 bearing against the outer side face, the two latter rollers being urged into engagement with the template by the springs 47 and 48. The cutting wheel 54 is also yieldably urged into engagement with the glass sheet by the spring 60.

The driving mechanism is then mounted upon the template 65 and connected with the cutting unit by the spring 93, the rollers 74, 84 and 85 being maintained in engagement with the template 65 by spring 88. The motor 78 is then started, and through the flexible shaft 77 and intermeshing gears 25 and 76 the driving mechanism 64 will be moved bodily around the template 65, this movement being transmitted through the spring connection 93 to the cutting unit 18 which is driven around the template 19.

Due to the two point contact of the cutting unit through the rollers 45 and 46 on one side of the template 19 and the one-point contact of the cutting unit through the roller 34 on the opposite side of the template, the cutting unit will follow the irregular contour of said template and maintain the cutting wheel 54 always tangent to the line of cut. This is also true of the driving mechanism 64 since the rollers 74, 84 and 85 are arranged in the same relation. The path of travel of the cutting wheel or in other words, the line of cut is indicated at 101 in Fig. 1.

While the template 65 is illustrated in the drawings as being of the same size as the template 19, it is preferred in some instances, such as when it is desired to cut relatively small radius, that the template 65 be somewhat larger than template 19. By employing a relatively larger template 65, and in so doing causing the driving mechanism to travel through a larger radius, the cutter carriage and consequently the cutting wheel will be slowed down when rounding the relatively sharp corners, thereby facilitating the proper scoring of the glass.

The provision of power actuated means for driving the cutting unit during the cutting operation, will greatly increase the speed of production of the machine as well as reducing to a minimum the effort and attention required on the part of the operator. In this way, sections of circular, elliptical and irregular outline may be cut out from the glass sheets rapidly, accurately and economically.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting glass sheets or plates, a table for supporting the sheet to be cut, a track template mounted horizontally above said table, a cutting unit arranged to travel on said track and including a cutting tool for scoring the glass, power actuated means for driving said cutting unit around said track, and means for mantaining the cutting edge of the cutting tool in a line tangent to that of the cut.

2. In a machine for cutting glass sheets or plates, a table for supporting the sheet to be cut, a track template mounted horizontally above said table, a cutting unit arranged to travel on said track and including a cutting tool for scoring the glass, a motor, operative drive connections between said motor and cutting unit for driving the latter around said track, and means for maintaining the cutting edge of the cutting tool in a line tangent to that of the cut.

3. In a machine for cutting glass sheets or plates, a table for supporting the sheet to be cut, a track template mounted horizontally above said table, a cutting unit arranged to travel on said track and including a cutting tool, power means for driving said cutting unit around said track, and yieldable drive connections between said power means and cutting unit.

4. In a machine for cutting glass sheets or plates, a table for supporting the sheet to be cut, a track template mounted horizontally above said table, a cutting unit arranged to travel on said track and including a cutting tool, a second track template mounted above the first track template, and power actuated means arranged to travel on said second track and operatively connected with said cutting unit for driving the latter around said first track.

5. In a machine for cutting glass sheets or plates, a table for supporting the sheet to be cut, a track template mounted horizontally above said table, a cutting unit arranged to travel on said track and including a cutting tool, a second track template mounted above the first track template, power actuated means arranged to travel on said second track, and yieldable drive connections between said power actuated means and cutting unit for driving the latter around said first track.

6. In a machine for cutting glass sheets or plates, a table for supporting the sheet to be cut, a track template mounted horizontally above said table, a cutting unit arranged to travel on said track and including a cutting tool, a second track template mounted above the first track template, a carriage arranged to travel on said second track, means for driving said carriage around the said track, and connections between said carriage and cutting unit for driving the latter around said first track.

7. In a machine for cutting glass sheets or plates, a table for supporting the sheet to be cut, a track template mounted horizontally above said table, a cutting unit arranged to travel on said track and including a cutting tool, a second track template mounted above the first track template, a carriage arranged to travel on said second track, a motor for driving said carriage around the said track, and a yieldable connection between said carriage and cutting unit for driving the latter around said first track.

8. In a machine for cutting glass sheets or plates, a table for supporting the sheet to be cut, a track template mounted horizontally above said table, a cutting unit arranged to travel on said track and including a cutting tool, a second track template mounted above the first track template, a carriage arranged to travel on said second track, a motor for driving said carriage around the said track, and a spring connecting said carriage and cutting unit for driving the latter around said first track.

9. In a machine for cutting glass sheets or plates, a table for supporting the sheet to be cut, a track template mounted horizontally above said table, a cutting unit arranged to travel on said track and including a cutting tool, a second track template mounted above the first track template, a housing arranged to travel on said second track, means on said housing engaging one side face of said track at spaced apart points, a member also on the housing contacting with the other side face of the track at a point intermediate the spaced apart points, means for yieldably urging said means into engagement with the said second track, means for driving the housing around said track, and connections between said housing and cutting unit for driving the latter around said first track.

10. In a machine for cutting glass sheets or plates, a table for supporting the sheet to be cut, a track template mounted horizontally above said table, a cutting unit arranged to travel on said track and including a cutting tool, a second track template mounted above the first track template, a housing arranged to travel on said second track, a pair of rollers carried by the housing and engaging one side face of said track at spaced apart points, a single roller also carried by the housing and contacting with the other side face of the track at a point intermediate the spaced apart rollers, resilient means for yieldably urging the pair of rollers toward and maintaining them in engagement with the said second track, means for driving the housing around said track, and connections between said housing and cutting unit for driving the latter around said first track.

11. In a machine for cutting glass sheets or plates, a table for supporting the sheet to be cut, a track template mounted horizontally above said table, a cutting unit arranged to travel on said track and including a cutting tool, a second track template mounted above the first track template, a housing arranged to travel on said second track, a pair of rollers carried by the housing and engaging one side face of said track at spaced apart points, a single roller also carried by the housing and contacting with the other side face of the track at a point intermediate the spaced apart rollers, resilient means for yieldably urging the pair of rollers toward and maintaining them in engagement with the said second track, means for driving the single roller to effect movement of the housing around said second track, and yieldable connections between said housing and cutting unit for driving the latter around said first track.

12. In a machine for cutting glass sheets or plates, a table for supporting the sheet to be cut, a track template mounted horizontally above said table, a cutting unit arranged to travel on said track and including a cutting tool, a second track template mounted above the first track template, a housing arranged to travel on said second track, a pair of substantially L-shaped levers pivotally mounted upon the housing, rollers carried at the inner ends of said levers and engaging one side face of the second track at spaced apart points, spring means connecting the outer end of said levers for drawing them together and urging the rollers toward and into engagement with said track, a single roller carried by the housing and engaging the other side face of the track at a point intermediate the spaced apart rollers, means for driving said single roller to effect movement of the housing around said second track, and a spring connection between said housing and cutting unit for driving the latter around said first track.

13. In a machine for cutting glass sheets or plates, a table for supporting the sheet to be cut, a track template mounted horizontally above said table, a cutting unit arranged to travel on said track and including a cutting tool, means on said cutting unit engaging opposite vertical side faces of said track at one and two points respectively, and power actuated means for driving said cutting unit around said track.

14. In a machine for cutting glass sheets or plates, a table for supporting the sheet to be cut, a track template mounted horizontally above said table, a cutting unit arranged to travel on said track and including a cutting tool, means on said cutting unit engaging one side face of said track at spaced apart points, a member on said unit contacting the other side face of the track intermediate said spaced apart points, resilient means for urging said last-named means into engagement with the track, a motor, and operative drive connections between said motor and cutting unit for driving the latter around said track.

15. In a machine for cutting glass sheets or plates, a table for supporting the sheet to be cut, a track template mounted horizontally above said table, a cutting unit arranged to travel on said track and including a cutting tool, rollers on said cutting unit engaging opposite vertical side faces of the track at one and two points respectively, and power actuated means for driving said cutting unit around said track.

16. In a machine for cutting glass sheets or plates, a table for supporting the sheet to be cut, a track template mounted horizontally above said table, a cutting unit arranged to travel on said track and including a cutting tool, a pair of rollers on said cutting unit engaging one side face of said track at spaced apart points, a third roller on said unit contacting the other side face of the track intermediate the two first named rollers, resilient means for urging said first mentioned rollers into engagement with the track, a motor, and operative drive connections between said motor and cutting unit for driving the latter around said track.

JOSEPH P. CROWLEY.